March 5, 1957 W. BLAIR 2,783,614
ROTARY PUMP AND MOTOR HYDRAULIC TRANSMISSION
Filed June 4, 1951 5 Sheets-Sheet 1

Inventor
Walter Blair
Barthel + Bugbee
Attorneys

March 5, 1957 W. BLAIR 2,783,614
ROTARY PUMP AND MOTOR HYDRAULIC TRANSMISSION
Filed June 4, 1951 5 Sheets-Sheet 2
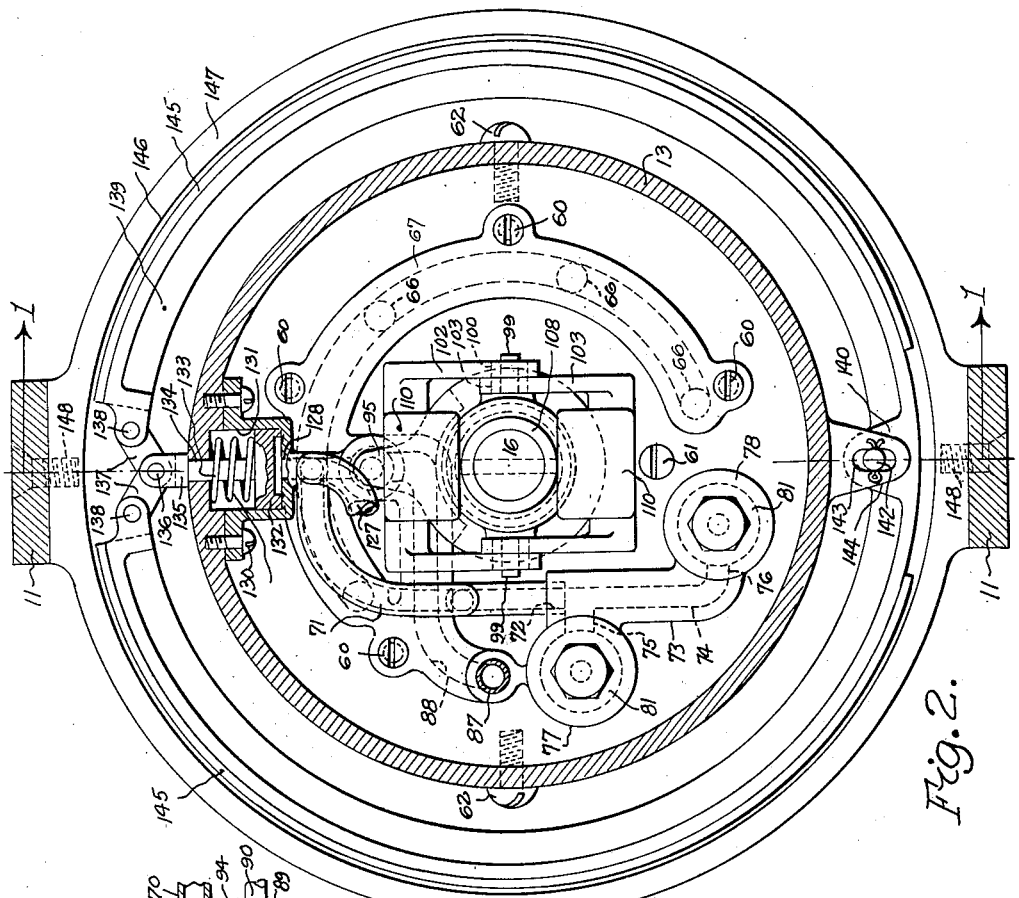
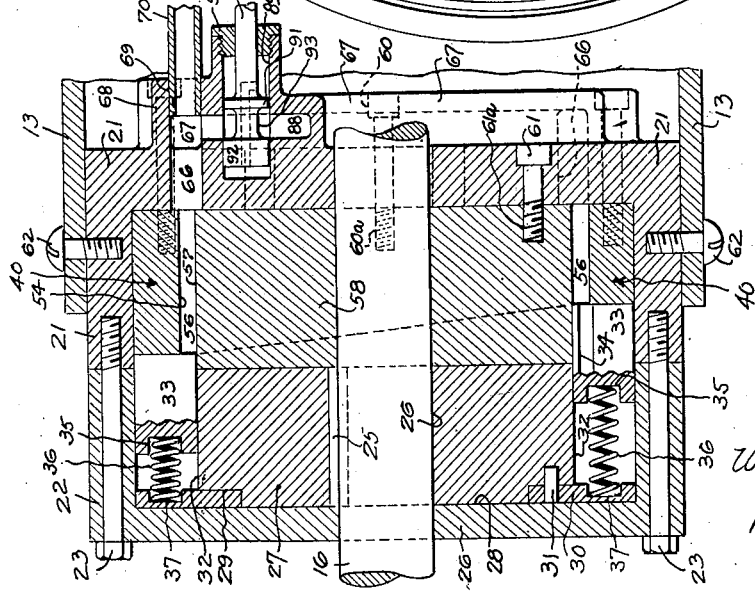
Inventor
Walter Blair
Barthel & Bugbee
Attorneys

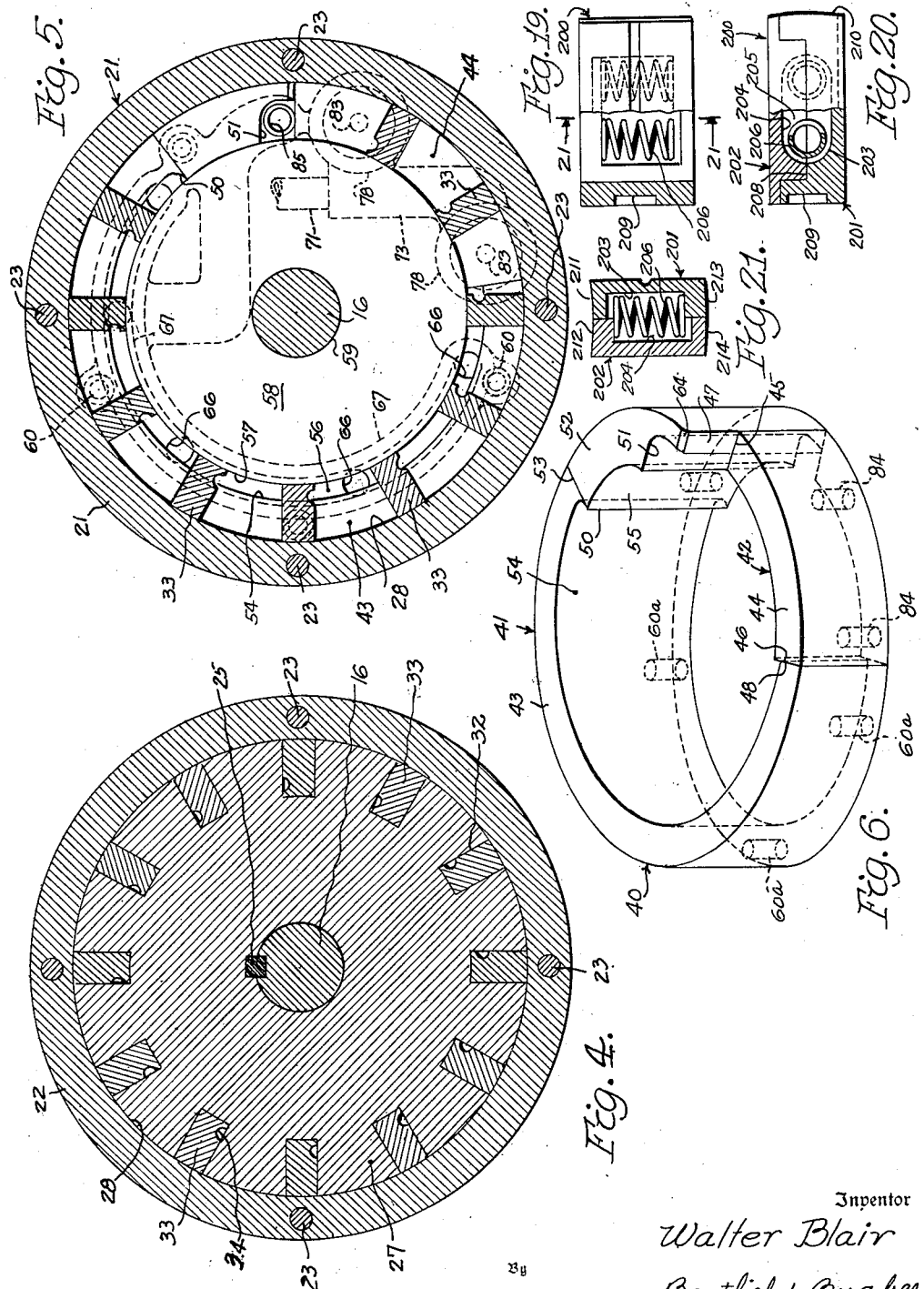

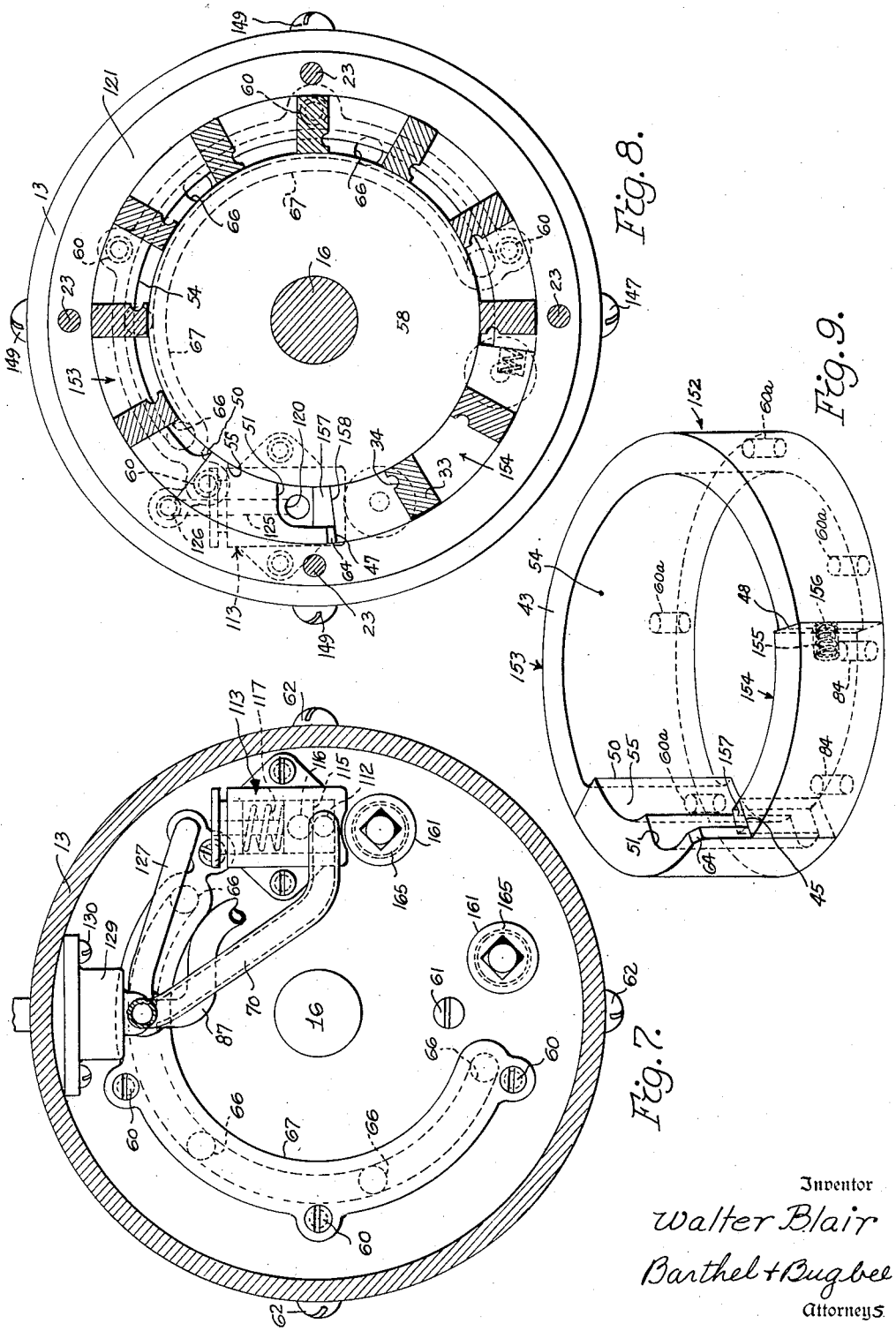

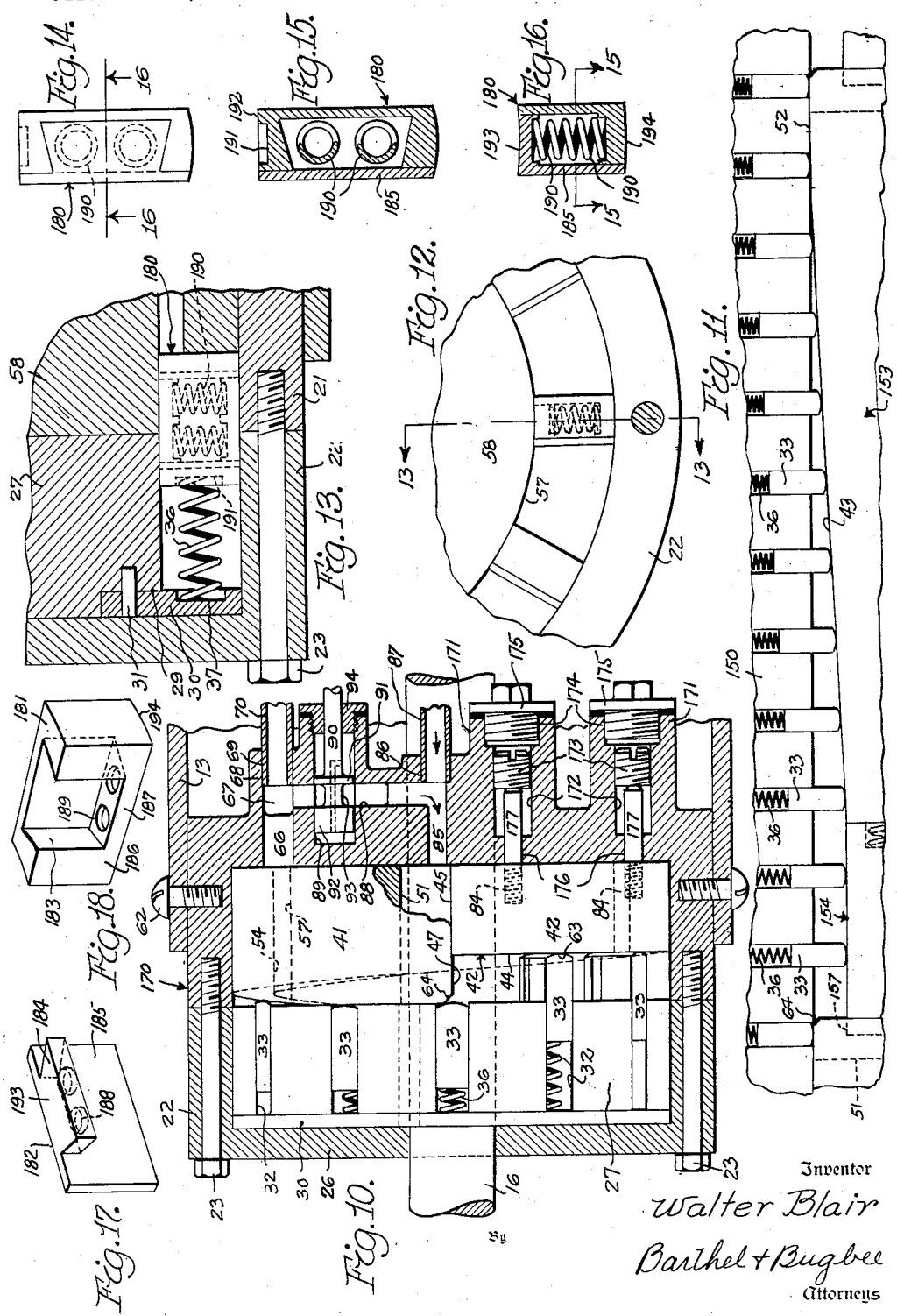

United States Patent Office 2,783,614
Patented Mar. 5, 1957

2,783,614

ROTARY PUMP AND MOTOR HYDRAULIC TRANSMISSION

Walter Blair, Detroit, Mich.

Application June 4, 1951, Serial No. 229,764

3 Claims. (Cl. 60—53)

This invention relates to automobile and other vehicle transmissions and in particular to so-called automatic transmissions.

One object of this invention is to provide a hydraulic vehicle transmission which will automatically alter its speed ratio in response to the load imposed thereon, without the necessity of employing planetary gearing or similar mechanism used in prior transmissions.

Another object is to provide an automatic variable-speed-ratio transmission which is enclosed in a housing of exceptionally small diameter, thereby satisfying the limited space requirements of modern motor vehicles with their low bodies and small road clearances.

Another object is to provide a completely hydraulic automatic transmission wherein the vanes or blades of the pump and motor rotors move in directions parallel to the axis of rotation in response to varying load requirements and in bringing the vehicle from a standstill up to a normal running speed.

Another object is to provide an automatic hydraulic transmission of the foregoing character wherein the housing of the transmission is either rotatable as a unit with the pump and motor of the transmission at one-to-one speed ratio at normal running speeds but which is automatically locked to a stationary part of the vehicle or other structure when the load requirements are raised above a predetermined amount, this locking being accomplished by an automatically operated brake.

Another object is to provide an automatic hydraulic transmission of the foregoing character wherein the discharge of pressure fluid from the pump is automatically bypassed from the pressure port to the suction port of the pump until the pump rotor reaches a predetermined speed, at which time the bypassing is automatically terminated in response to the action of a speed-responsive governor.

Another object is to provide an automatic transmission of the foregoing character wherein the pump and motor rotors have axially-slidable vanes or blades which are moved to and fro by an annular cam or crown cam, a portion of which is probably movable relatively to the remainder of the cam in order to vary the delivery rate of the pump or to vary the fluid intake rate of the motor.

Further objects and advantages of the invention will become apparent from the following description of the accompanying drawings, wherein:

Figure 2 is a cross section taken along the line 2—2 in Figure 1 looking toward the pump unit and the bypass governor;

Figure 3 is a fragmentary vertical section taken in the same plan as Figure 1 but showing the pump unit completely in section;

Figure 4 is a cross-section taken along the line 4—4 in Figure 1 through the pump rotor;

Figure 5 is a cross-section through the pump unit taken along the line 5—5 in Figure 1;

Figure 6 is a perspective view of the annular cam or crown cam used in the pump unit;

Figure 7 is a cross section taken along the line 7—7 in Figure 1, looking toward the motor unit and showing the pressure - responsive valve and brake - operating cylinder;

Figure 8 is a cross section through the motor unit taken along the line 8—8 in Figure 1;

Figure 9 is a perspective view of the annular cam or crown cam used in the motor unit of Figure 1;

Figure 10 is a central vertical section through a modified pump unit of the transmission of this invention, wherein the pump delivery is adjusted manually rather than automatically;

Figure 11 is a developed view of the crown cam of the motor unit shown in Figure 1, together with the positions of the vanes at different locations along the cam;

Figure 12 is a fragmentary end elevation of a motor rotor of a modified construction, employing a modified vane;

Figure 13 is a fragmentary central vertical section through the rotor portion shown in Figure 1, taken along the line 13—13 in Figure 12;

Figure 14 is a top plan view of the modified vanes shown in Figures 12 and 13;

Figure 15 is a longitudinal section through the modified vanes shown in Figure 14 taken along the line 15—15 in Figure 16;

Figure 16 is a cross-section through the modified vane shown in Figures 14 and 15, taken along the line 16—16 in Figure 14;

Figure 17 is a perspective view of one of the relatively movable vane parts of the modified vane shown in Figures 14 to 16, inclusive;

Figure 18 is a perspective view of the other vane part of the modified vane shown in Figures 14 to 17, inclusive;

Figure 19 is a side elevation, partly in longitudinal section, of another modified vane;

Figure 20 is a top plan view, partly in horizontal section, of the modified vane shown in Figure 19; and Figure 21 is a cross section through the modified vane of Figures 19 and 20 taken along the line 21—21 in Figure 19.

Figure 1:
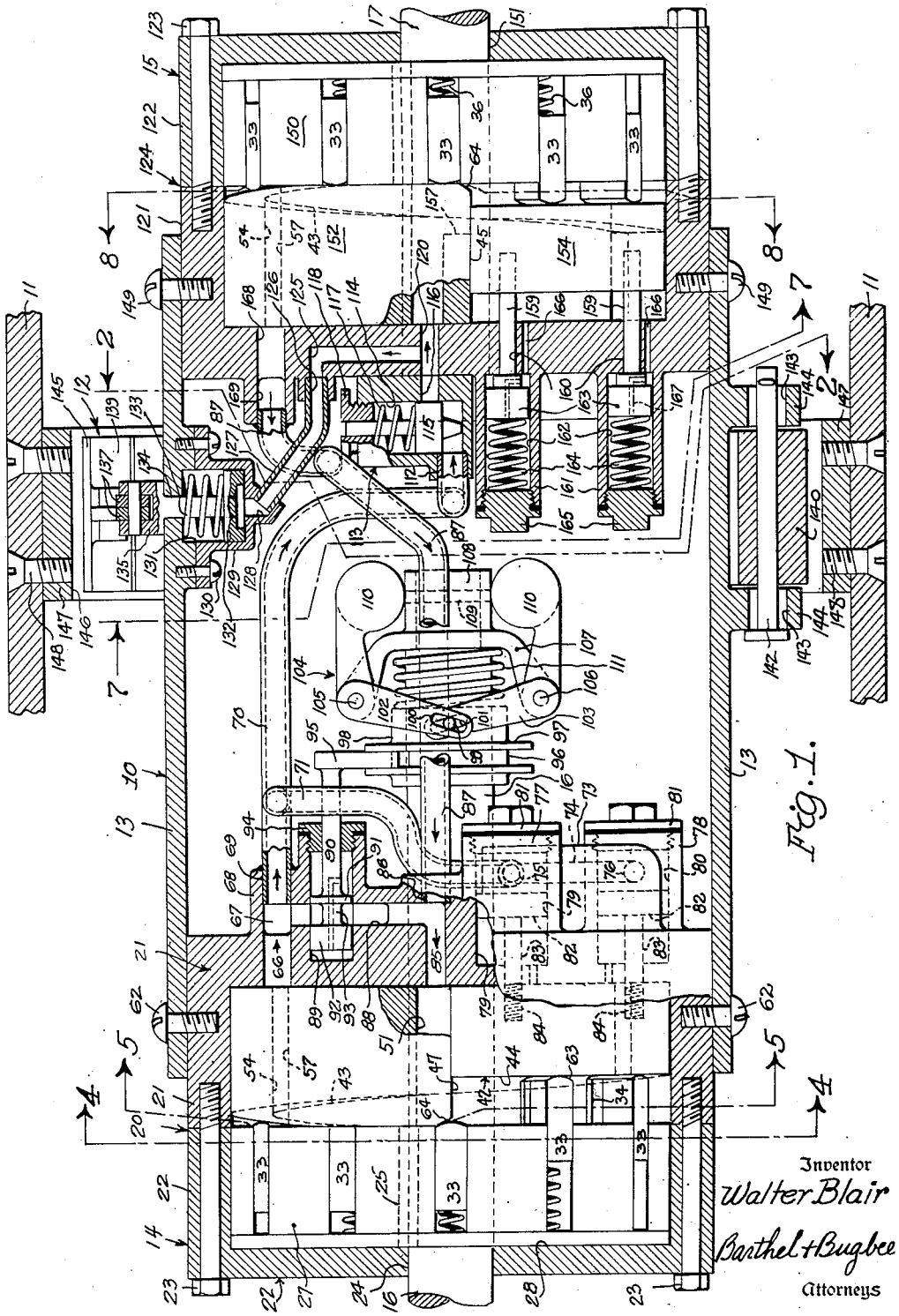
Figure 1 is a central vertical section through an automatic hydraulic transmission according to one form of the invention, with certain of the pump and motor parts in side elevation, taken along the line 1—1 in Figure 2.

Referring to the drawings in detail, Figure 1 shows a central vertical section through an automatic hydraulic transmission, generally designated 10, according to one form of the invention, as applied to a vehicle having frame members or other stationary structural portions 11 to which the transmission 10 is selectively connected through an automatically operated brake device 12. The transmission 10 includes a tubular casing or housing 13 having at its left-hand end a pump unit generally designated 14 and at its right-hand end a motor unit generally designated 15, the pump unit 14 being driven by an input shaft 16 and the motor unit 15 driving an output shaft 17. When the transmission 10 is installed in a vehicle, such as an automobile, the input shaft 16 is ordinarily connected to the crank shaft of the engine and the output shaft 17 to the propeller shaft leading to the differential in the rear axle housing of the vehicle.

The pump unit 14 is housed in a cylindrical hollow block 20 composed of cooperating halves 21 and 22 bolted together as at 23. The input shaft 16 passes through a bore 24 in the pump casing half 22 and is keyed or otherwise drivingly secured as at 25 (Figure 3) in the bore 26 of a pump rotor 27 which is rotatably mounted in the casing half 22. The pump rotor 27 has an annular recess 29 in which fits an annular thrust ring 30 which is fixedly positioned relatively to the rotor 27 by a locating pin 31.

The pump rotor 27 (Figure 4) is in the form of a cylindrical block containing radial grooves 32 spaced at intervals around the circumference thereof, these grooves containing axially-slidable vanes 33 having pressure-equalizing grooves 34 extending from end to end thereof (Figures 3 and 4). The rearward ends of the vanes 33 contain sockets 35 receiving its forward ends of compression springs 36 the rearward ends of which are seated in sockets 37 in the thrust ring 30.

The forward ends of the vanes 33 engage a crown cam or annular cam generally designated 40 (Figure 6) having a fixed part 41 and a movable part 42. The fixed and movable cam parts 41 and 42 have approximately annular cam surfaces 43 and 44, respectively, these surfaces being co-extensive with one another in one position thereof. The movable cam portion 42 is of arcuate form, and has opposite ends 45 and 46 respectively engaging the opposite ends 47 and 48 of the fixed cam portion 41. The ends 45, 46, 47, 48 are radially directed to permit axial sliding motion of the movable cam portion 41.

The cam surface 43 is in the form of a helix or ramp up which the forward ends of the vanes 33 ascend until they reach the enlarged portion 50 (Figure 6) of the fixed cam portion 41, this having an axial recess or groove 56 for the flow of pressure fluid generated by the pump unit 14, the recess 51 serving as a pressure fluid intake port (Figure 1). The cam surface 52 between the junction 53 of the enlarged portion 50 and the end 47 is level and not helical, as is also the cam surface 44 on the movable cam portion 42, as is clearly seen in the developed view (Figure 11) which illustrates the successive positions of the vanes 33 in a diagrammatic manner. The inner surface 54 of the fixed cam portion 41 is spaced radially outward from the continuation of the inner surface 55 of the enlargement 50 so as to provide an annular fluid discharge passageway 56 (Figure 5) between the inner cam surface 54 and the outer surface 57 of a cylindrical body or filler block 58 having a bore 59 for the passage of the shaft 16. The fixed cam 41 and the filler block 58 are bolted or otherwise secured (Figure 3) to the end wall of the pump casing half 21 by screws 60 and 61, respectively, threaded into sockets 60a and 61a, respectively. The casing half 21 in turn is bolted as at 62 to the cylindrical housing or casing 13.

The forward ends of the vanes 33 are rounded as at 63 (Figure 1) in order to more easily travel along the cam surfaces 44 and 43 of the crown cam 40, and the corner 64 at the junction of the level cam surface 52 and the end 47 of the fixed cam 41 is beveled for the same purpose. The end wall of the pump casing half 21 in line with the annular space or passageway 65 between the concentric surfaces 54 and 57 (Figure 5) of the fixed cam portion 41 and the filler block 58 is provided with circumferentially-spaced fluid discharge ports 66 arranged in an arcuate path at intervals therealong in order to permit discharge of the pressure fluid generated by the pump unit 14. These ports 66 are interconnected by an arcuate discharge manifold 67 integral with the casing half 21 (Figure 2), the manifold 67 having an outlet boss 68 (Figure 1) aligned with one of the ports 66 and bored as at 69 to receive the end of a pressure fluid discharge pipe 70. From the pressure fluid discharge pipe 70, an auxiliary pipe 71 extends downward to a port 72 (Figure 2) in an intake manifold 73 which is likewise integral with the casing half 21, the intake manifold 73 having a fluid passageway 74 leading to inlet ports 75 and 76 of a pair of cam-operating cylinders 77 and 78 having cylinder bores 79 and 80, respectively (Figure 1). The cylinder bores 79 and 80 at their outer ends are threaded to receive cylinder heads 81. Reciprocably mounted in the cylinder bores 79 and 80 are piston heads 82 having piston rods 83 threaded into threaded sockets 84 in the movable crown cam portion 42. The pistons 82 move the movable cam portion 42 to and fro axially in response to the variation of pressure in the conduits 70 and 71.

The fluid intake port or recess 51 in the enlargement 50 of the fixed crown cam portion 41 is aligned with an intake port 85 (Figure 1) in the end wall of the casing half 21, and this in turn is aligned with a bore 86 into which the rearward intake pipe 87 is secured. A bypass passageway 88 extends through the end wall of the casing half 21 from the port 85 to the port 66 and intermediate its ends contains a valve bore 89 having a valve plunger 90 with spaced heads 91 and 92 thereon separated by an annular reduced diameter portion 93. The valve plunger 90 passes through a suitably bored plug 94 and is connected at its forward end to a yoke 95 which engages the groove 96 of a collar 97 drivingly mounted upon the input shaft 16. The hub 98 of the collar 97 is provided with outwardly-extending diametrically opposite pins 99 which engage slots 100 and 101 in bellcranks 102 and 103, respectively, of a flyball governor, generally designated 104, the bellcranks 102 and 103 being pivoted at 105 and 106, respectively, to a bracket 107 having a hub 108 pinned as at 109 to the end of the input shaft 16. The bellcranks 102 and 103 at their free ends are provided with flyweights 110. A compression spring 111 surrounds the shaft 16 between the bracket 107 and the collar 98 and urges the collar 98 toward the pump unit 14.

The motor unit 15 (Figure 1) receives pressure fluid from the pump unit 14 by way of the conduit 70 the end of which is secured in a port 112 in a pressure-responsive valve 113 having a cylinder bore 114 in which a valve piston 115 is reciprocably mounted and urged downward into closing relationship between the inlet port 112 and an outlet port 116 by means of a spring 117, the opposite end of which engages a threaded plug 118 threaded into the upper end of the cylinder bore 114. The spring 117 is sufficiently stiff to require the generation of a considerable pressure by the pump unit 14 before the valve piston 115 lifts and admits fluid from the inlet port 112 to the outlet port 116.

The outlet port 116 of the pressure-responsive valve 113 opens into the inlet port 120 of the motor casing half 121 which is in turn bolted to the casing half 122 by the bolts 123. These casing halves 121 and 122 together form the motor casing or housing 124. The end wall of the casing half 121 contains a passageway 125 leading from the motor inlet port 120 to an auxiliary port 126, from which a brake pressure pipe 127 leads to an inlet port 128 in a brake-operating cylinder 129 bolted as at 130 to the cylindrical transmission housing or shell 13.

The brake operating cylinder 129 contains a bore 131 (Figure 2) in which is mounted a piston 132 urged downward by a spring 133. The rod of the piston 132 extends through an opening 134 in the transmission housing 13 and carries a clevis 135 with a pivot pin 136 on which links 137 are pivotally mounted, the links 137 being pivotally attached as at 138 to the free ends of a brake shoe 139 of arcuate form. The diametrically opposite portion of the brake band 139 is provided with a boss 140 which is bored as at 141 (Figure 1) to receive a headed pivot pin 142 which passes through elongated slots 143 in ears 144 extending outward from the cylindrical transmission shell or housing 13. The brake band 139 is provided with a brake lining 145 which frictionally engages the inner surface 146 of a brake drum 147, the latter being secured as at 148 to the stationary vehicle frame portion 11.

The motor casing half 121 is secured as at 149 to the right-hand end of the transmission housing 13. With the exception of the structure connected to the end wall of the motor casing 121 is secured as at 149 to the right-hand end of the transmission housing 13. With the exception of the structure connected to the end wall of the motor casing 121 and two minor additions to the crown cam or ring cam, the motor unit 15 is substantially identical in construction to the pump unit 14, except that the inlet port in the one becomes the outlet port in the other and vice versa. Accordingly a duplication of description is unnecessary and similar reference numerals are used to designate corresponding parts of the pump unit 14 and motor unit 15. It will be observed, however, that the motor unit 15 faces in the opposite direction from the pump unit 14, in that the cams of both are located on the inner side and the rotor assemblies on the outer side (Figures 1).

In particular, the motor rotor generally designated 150 lies within the motor casing half 122 and is keyed or otherwise drivingly secured to the output shaft 17 which passes through a bore 151 in the end wall of the casing half 122. The motor crown cam or ring cam, generally designated 152, as stated above, is of substantially identical construction to the pump crown cam 40 except that the stationary cam portion 153 is disposed in the opposite direction of inclination of its cam surface 43, as is seen by a comparison of Figures 6 and 9. The movable cam portion 154, otherwise is a substantial duplication thereof, with the same reference numerals, except that it contains a spring socket 155 with a compression spring 156 seated therein. The fixed or stationary cam portion 153, however, has a sealing lug or boss 157 (Figure 9) projecting radially inward from the end of the enlarged cam portion 50 so as to form a partition (Figure 8) and also an extension 158 of the end surface 47 of the stationary cam portion 153. The boss or partition 157 prevents leakage of oil or other working fluid from the port 51 underneath the movable cam portion 154 when the latter is raised and also gives a much larger sealing surface for the end surface 45 of the movable cam portion 154. This sealing action is enhanced by the thrust of the spring 156, the outer end of which slidably engages the end surface 48 of the fixed or stationary cam portion 153.

Instead of the hydraulic pistons 82 used in the pump unit 14 to shift the movable cam portion 42, the motor movable cam portion 154 is shifted by spring-pressed plungers 159 (Figure 1) threaded into the threaded bores 84 therein and passing through bores 160 in the end wall of the casing half 121 into cylinder bosses 161 containing bores 162 in which the plunger heads 163 reciprocate. The plunger heads 163 and their spring-pressed plungers 159 of which they form a part are urged to the right (Figure 1) by compression springs 164, the opposite ends of which abut plugs 165 or cylinder heads threaded into the outer ends of the cylinder bores 162. Leakage passageways 166 and 167 are provided in the end wall of the casing half 121 and plunger heads 163 respectively to prevent entrapment of fluid therein, which might escape out of the motor unit 15. The pump intake pipe 87 connects with outlet ports 168, 169.

The modified pump unit, generally designated 170 (Figure 10), is similar in all respects to the pump unit 14 (Figure 1), except that the movable cam portion 42 of the crown cam 40 is provided with a fixed adjustment of its maximum delivery rather than the automatic pressure-responsive adjustment provided by the pistons 82 in the cylinders 77 and 78, hence the same reference numerals are employed for corresponding parts. In place of the cylinders 77 and 78, there are provided bosses 171 containing threaded bores 172 into which plugs 173 are threaded, the threaded bores 172 being provided with threaded counterbores 174 for receiving threaded plugs 175. The end walls of the bores 172 contain smaller bores 176 through which pins 177 slidably extend, the pins 177 being threaded into the sockets 84 in the movable cam portion 42 in place of the piston rods of the pistons 82 of Figure 1. Thus, the modification of Figure 10 provides fixed stops 173 for limiting the travel of the pins 177 in place of the yielding hydraulic pistons 82 of Figure 1. Thus, the modification of Figure 10 provides fixed stops 173 for limiting the travel of the pins 177 in place of the yielding hydraulic pistons 82 of Figure 1.

The modified compound vane generally designated 180 (Figures 12 to 18 inclusive) is made with relatively slidable parts instead of being solid, as in the case of the vanes 33 of the pump and motor units 14 and 15 (Figure 1). In order to provide a take-up for wear during operation, the vane 180 consists of cooperating halves 181 and 182. The major portion 181 contains a recess 183 of dovetail cross-section into which fits a plate-like projection 184 of corresponding dovetail cross-section so as to provide sliding engagement therebetween. The dovetail portion 184 projects at right angles from a rectangular plate 185 which, in assembly, slidably engages an abutment surface 186 (Figures 17 and 18). The dovetail portion 184 and the bottom wall 187 of the recess 183 are provided with spring sockets 188 and 189 respectively receiving the opposite ends of compression coil springs 190. The major portion 181 also contains a spring socket 191 on its rearward end 192 (Figure 15) for receiving the end of the coil spring 36 (Figure 13). The longitudinal top and bottom surfaces 193 and 194 are of partly cylindrical curvature (Figures 16) ground to the same radii as the surfaces 57 and 28 of the cylindrical block 58 and outer casing half 22 respectively. The springs 190 thus force the surfaces 193 and 194 in opposite directions into sealing engagement with the cylindrical surfaces 57 and 28 just mentioned (Figure 5), so that a snug sealing engagement is effected.

The modified compound vane 200 (Figures 19, 20 and 21) is of similar purpose but slightly different construction from the compound vane 180 of Figures 12 to 18 inclusive. The compound vane 200 consists of major and minor halves or portions 201 and 202 respectively containing half cavities 203 and 204 facing toward one another to provide a spring cavity 205 for receiving compression coil springs 206. The vane halves 201 and 202 have stepped abutment surfaces 207 and 208 respectively along the boundaries of the two halves 201 and 202. These surfaces slidably engage one another (Figure 20). The vane half 201 is provided with a spring socket 209 in its rearward end for the coil spring 36, and the forward end is rounded as at 210, the same as with the solid vanes 33 of Figure 1.

The upper surfaces 211, 212 and the lower surfaces 213, 214 of the vane halves 201 and 202 are ground to concave and convex cylindrical curvatures respectively (Figure 21) to snugly fit the curvatures of the external and internal cylindrical surfaces 57 and 28 respectively (Figure 5). The half cavities 203 and 204, however, are staggered relatively to one another (Figure 21) so that the ends of the coil springs 206 engage only one of the halves at a time. The result of this staggered construction is that the halves 201 and 202 are moved in opposite directions by the coil springs 206, namely in a direction radially of the bore 59 and shaft 16 (Figure 5) as well as of the external and internal surfaces 57 and 28 of the filler block 58 and pump casing half 22.

*Operation*

In the operation of the invention, let it be assumed first that the engine of the vehicle has been started and is rotating the input shaft 16 slowly at an idling speed. At such an idling speed, the fluid discharged by the pump unit 14 through the port 66 and manifold 67 is bypassed through the passageway 88 (Figure 1) in view of the fact that the bypass valve plunger 90 is in its open position because the speed of the input shaft 16 is not great enough to cause the flyball governor 104 to shift the valve plunger 90 and close the bypass valve 90. At the same time, since the pressure-responsive valve 113 is closed by its spring 117, and because the discharge of pressure fluid from the pump unit 14 is being bypassed, the brake operating plunger 132 remains pushed downward by its spring 133, disengaging the brake band 139 from the brake drum 147. Consequently, the casing 13 rotates idly at this time since it is not anchored to the frame 11 by the brake 12.

To start the vehicle moving from a standstill, the operator speeds up the engine so that the input shaft 16 rotates at a rapid rate. This causes the flyball governor arms 110 to move outward, shifting the collar 96 and valve plunger 90 to the right, closing the bypass valve passageway 88. Meanwhile, the pump rotor 27 of the pump unit 14 has been rotating relatively to the cam 40, causing the vanes 33 to travel up the inclined cam path 43, expelling pressure fluid through the ports 66 (Figure 5) and gradually retracting the vanes 33 into their grooves or slots 32 until the ends of the vanes 33 reach the level portion 52 of the cam path, at which point the vanes 33 are completely retracted or pushed into their grooves 32. As the rotor 27 continues to rotate, the ends of the vanes 33 drop off the ledge 64 and down the shoulder 47 to the level cam path 44 of the movable cam portion 42 repeating the cycle (Figures 6 and 11). The pressure fluid thus discharged through the port 66 passes into the manifold 67 and thence into the outlet pipe 70. At this time, however, the spring 117 of the pressure-responsive valve 113 is sufficiently powerful to keep the valve plunger 115 closed.

If the vehicle is at a standstill, the output shaft 17 is thus subjected to a heavy load which requires the building up of an extensive pressure in order to move it. This pressure is built up in the pipe 70 and is transferred to the auxiliary pipe 71 and through the ports 75 and 76 into the cylinders 77 and 78, shifting the pistons 82 and the movable cam portion 42 to the left. This pushes the vanes 33 to the left into their grooves 32. The smaller area of the exposed tips of the vanes 33 enables them to build up a higher pressure in the discharge pipe 70 for a given power input to the shaft 16 until this pressure is eventually sufficient to overcome the downward thrust of the spring 117 of the pressure-responsive valve 113, opening this valve and permitting pressure fluid to pass through the port 120 into the motor unit 15 and also to pass through the passageway 125 and pipe 127 into the brake operating cylinder 129. This action overcomes the thrust of the spring 133 and raises the brake operating piston 132 (Figure 2), applying the brake band 133 and its brake lining 145 to the brake drum 147 through the action of the toggle links 137. This locks the casing or housing 13 to the vehicle frame or other stationary portion 11, preventing the housing 13 from rotating. Meanwhile, the portion of the pressure fluid which has passed through the port 120 into the motor unit 15 has acted against the projecting ends of the vanes 33, rotating the motor rotor 150 and causing the vanes 33 to be retracted as they travel up the cam path 43 of the motor cam 152 (Figure 9) in the manner previously described in connection with the pump cam 40. As the vanes 33 drop off the ledge or end 64 of the stationary cam portion 153, they are subjected one by one to the pressure fluid entering through the port 116 and channel 151. This pressure is exerted upon each vane 33 for an arcuate distance of approximately 15 degrees, imparting a torque to the output shaft 17 until the next succeeding vane 33 drops over the ledge 64 and is itself subjected to pressure fluid. As the vanes move around with the motor rotor 150, the entrapped fluid passes outward through the discharge ports 168 of the motor unit 15 and through the discharge port 169 and pipe 87 back to the intake port 85 of the pump unit 14, completing the circuit. The successive positions of the vanes 33 relatively to the cam portions 153 and 154 of the motor cam 152 (Figure 9) are shown diagrammatically in the developed or layout view of Figure 11. As the starting load is overcome and the output shaft 17 starts rotating, the pressure required to rotate the motor rotor 150 becomes less, hence the plungers 163 push the movable cam portion 154 to the right under the influence of the springs 164 (Figure 1), shortening the projecting portions of the vanes 33. At the same time, the drop of pressure gradually permits the pressure-responsive valve 115 to seat, causing the suction of the pump unit 14 to relieve the pressure within the motor unit 15 and within the brake-operating cylinder 129. The spring 133 then pushes the brake-operating piston 132 downward, disengaging the brake band 139 and its lining 140 from the brake drum 147. The fluid trapped within the pump casing 20 and motor casing 124 then prevents independent rotation of the pump and motor rotors 27 and 150, causing the entire assembly of mechanism within the hollow cylindrical shell or housing 13 to rotate as a unit and giving a one-to-one drive ratio between the input and output shafts 16 and 17.

The foregoing description of the operation assumes forward travel only of the vehicle. For backing, reverse travel of the vehicle is accomplished by conventional reversing mechanism which forms no part of the present invention, such reversing mechanisms being well-known to automotive engineers.

The operation of the modification shown in Figure 10 is similar to that previously described in connection with Figures 1 to 9 inclusive except that the delivery of the pump unit 14 is not automatically varied in accordance with the pressure but is adjusted to a fixed position by means of the threaded stop plugs 133. The latter limit the reciprocation of the movable cam portion 42 of the pump unit cam 40 and consequently limit the amount by which the vanes 33 can project from the rotor 27.

The operation of the compound vanes 180 (Figures 12 to 18 inclusive) is similar to that of the solid vanes 33 except that the springs 190 cause the opposite halves 181 and 182 of the vane 180 to move relatively to one another and thus to completely fill the space between the opposing surfaces 57 and 28 (Figure 5) even if wear subsequently occurs.

The operation of the compound vanes 200 shown in Figures 21 to 24 inclusive is also similar to that of the solid vanes 33, except that, as in the case of the compound vanes 180, the springs 206 force the opposing halves 201 and 202 in opposite directions since each end of each spring exerts pressure on only one of the halves (Figure 21). Accordingly, the compound vanes 200 also take up wear and completely fill the space between the concentric cylindrical surfaces 57 and 28 (Figure 5).

It is obvious from a consideration of the pump unit 14 and motor unit 15, as well as the modified pump unit 170 of Figure 10 that the motor unit 15 may be used as a pump by driving its rotor 150, or the pump unit 14 may be used as a motor by supplying pressure fluid to it.

What I claim is:

1. An automatic variable speed ratio transmission for drivingly connecting a power-driven input shaft to a load-connected output shaft, said transmission comprising a rotary housing, a rotary variable delivery hydraulic pump unit and a rotary hydraulic motor unit mounted in said housing, each of said units having a casing attached to said housing and containing a bore with fluid inlet and outlet passages communicating therewith, each bore having a rotor therein operatively connected to a different one of said shafts and having movable vanes yieldingly engaging said bore, cam means for actuating the vanes of said pump unit, cam means for actuating the vanes of said motor unit, a pressure fluid supply conduit connecting the pump unit outlet passage to the motor unit inlet passage, a fluid exhaust conduit connecting the motor unit outlet passage to the pump unit inlet passage, a brake having a movable member mounted on said housing and a stationary member engageable thereby, and a hydraulic piston and cylinder device hydraulically connected to said supply conduit and operatively connected to said movable brake member, said device being responsive to the attainment of a predetermined pressure in said supply conduit for shifting said movable brake member into braking engagement with said stationary brake member.

2. An automatic variable speed ratio transmission for drivingly connecting a power-driven input shaft to a load-connected output shaft, said transmission comprising a rotary housing, a rotary variable delivery hydraulic pump unit and a rotary hydraulic motor unit mounted in said housing, each of said units having a casing attached to said housing and containing a bore with fluid inlet and outlet passages communicating therewith, each bore having a rotor therein operatively connected to a different one of said shafts and having movable vanes yieldingly engaging said bore, cam means for actuating the vanes of said pump unit, cam means for actuating the vanes of said motor unit, a pressure fluid supply conduit connecting the pump unit outlet passage to the motor unit inlet passage, a fluid exhaust conduit connecting the motor unit outlet passage to the pump unit inlet passage, a brake having a movable member mounted on said housing and a stationary member engageable thereby, a hydraulic piston and cylinder device hydraulically connected to said supply conduit and operatively connected to said movable brake member, and a pressure-responsive valve disposed between said supply conduit and said device and responsive to the attainment of a predetermined pressure in said supply conduit for opening and admitting pressure fluid to said device for shifting said movable brake member into braking engagement with said stationary brake member.

3. An automatic variable speed ratio transmission for drivingly connecting a power-driven input shaft to a load-connected output shaft, said transmission comprising a rotary housing, a rotary variable delivery hydraulic pump unit and a rotary hydraulic motor unit mounted in said housing, each of said units having a casing attached to said housing and containing a bore with fluid inlet and outlet passages communicating therewith, each bore having a rotor therein operatively connected to a different one of said shafts and having movable vanes yieldingly engaging said bore, cam means for actuating the vanes of said pump unit, cam means for actuating the vanes of said motor unit, a pressure fluid supply conduit connecting the pump unit outlet passage to the motor unit inlet passage, a fluid exhaust conduit connecting the motor unit outlet passage to the pump unit inlet passage, a brake having a movable member mounted on said housing and a stationary member engageable thereby, a hydraulic piston and cylinder device hydraulically connected to said supply conduit and operatively connected to said movable brake member, a pressure-responsive valve disposed between said supply conduit and said device and responsive to the attainment of a predetermined pressure in said supply conduit for opening and admitting pressure fluid to said device for shifting said movable brake member into braking engagement with said stationary brake member, said pump unit having a bypass passage connecting said supply and exhaust conduits, a normally-open bypass valve in said bypass conduit, and a speed-responsive governor drivingly connected to said input shaft and operatively connected to said bypass valve to shift said valve to its closed position in response to the attainment of a predetermined speed of said input shaft.

References Cited in the file of this patent

UNITED STATES PATENTS

| Number | Name | Date |
|---|---|---|
| 732,671 | Andrews | June 30, 1903 |
| 761,512 | Lecomte | May 31, 1904 |
| 797,869 | Scott | Aug. 22, 1905 |
| 1,042,696 | Lehne | Oct. 29, 1912 |
| 1,057,251 | Manley | Mar. 25, 1913 |
| 1,079,384 | Wilson | Nov. 25, 1913 |
| 1,163,330 | Ethridge | Dec. 7, 1915 |
| 1,571,954 | Lambert | Feb. 9, 1926 |
| 1,697,041 | Balsiger | Jan. 1, 1929 |
| 1,797,905 | Dooley | Mar. 24, 1931 |
| 1,846,557 | Imshenetsky | Feb. 23, 1932 |
| 2,330,565 | Eckart | Sept. 28, 1943 |
| 2,443,074 | Kraft | June 8, 1948 |
| 2,517,862 | Frederick | Aug. 8, 1950 |
| 2,574,819 | Eisele | Nov. 13, 1951 |
| 2,581,160 | Adams et al. | Jan. 1, 1952 |
| 2,606,422 | Glenn | Aug. 12, 1952 |